US009832615B2

(12) United States Patent
Palanki et al.

(10) Patent No.: US 9,832,615 B2
(45) Date of Patent: Nov. 28, 2017

(54) MOBILE DEVICE SENSOR AND RADIO FREQUENCY REPORTING TECHNIQUES

(71) Applicant: QUALCOMM Incorporated, San Diego, CA (US)

(72) Inventors: Ravi Palanki, Cupertino, CA (US); Nima Noorshams, Fremont, CA (US); Payam Pakzad, Mountain View, CA (US)

(73) Assignee: QUALCOMM Incorporated, San Diego, CA (US)

(*) Notice: Subject to any disclaimer, the term of this patent is extended or adjusted under 35 U.S.C. 154(b) by 74 days.

(21) Appl. No.: 14/490,555

(22) Filed: Sep. 18, 2014

(65) Prior Publication Data

US 2016/0088440 A1 Mar. 24, 2016

(51) Int. Cl.
*H04W 4/04* (2009.01)
*G01S 5/02* (2010.01)
*G01C 21/20* (2006.01)
*H04W 24/10* (2009.01)
(Continued)

(52) U.S. Cl.
CPC ............ *H04W 4/04* (2013.01); *G01C 21/206* (2013.01); *G01S 5/0242* (2013.01); *H04W 24/10* (2013.01); *G01S 5/0018* (2013.01); *G01S 19/39* (2013.01)

(58) Field of Classification Search
CPC ....... H04W 24/10; H04W 4/04; G01S 5/0242; G01S 19/39; G01S 5/0018; G01C 21/206
See application file for complete search history.

(56) References Cited

U.S. PATENT DOCUMENTS 6,522,266 B1 * 2/2003 Soehren ............... A61B 5/7264
340/988
7,388,541 B1 * 6/2008 Yang .................... G01C 21/206
342/464
(Continued)

FOREIGN PATENT DOCUMENTS

WO WO 2013/065042 A1 5/2013

OTHER PUBLICATIONS

Alzantot M., et al., "CrowdInside: Automatic Construction of Indoor Floorplans," arXiv:1209.3794v1 [cs.OH], Sep. 17, 2012, 11 pages.
(Continued)

*Primary Examiner* — Joseph Dean, Jr.
(74) *Attorney, Agent, or Firm* — Blakley, Sokoloff, Taylor & Zafman (57) ABSTRACT

Method, mobile device, computer program product, and apparatus for optimizing sensor reporting are described. A mobile device can measure radio frequency (RF) signal characteristics while receiving data from one or more mobile device sensors. The mobile device may determine its relative displacement between RF signal measurements. The mobile device can send a representation of the RF signal characteristics and the displacement data to one or more servers. The representation displacement data may include one or more reliability characteristics and/or a displacement reliability rating. A server can obtain the displacement data and RF signal characteristics to determine positioning of wireless transmitters in an environment and build a positioning database.

29 Claims, 7 Drawing Sheets

(51) Int. Cl.
*G01S 19/39* (2010.01)
*G01S 5/00* (2006.01)

(56) References Cited

U.S. PATENT DOCUMENTS

| | | | |
|---|---|---|---|
| 8,102,784 B1* | 1/2012 | Lemkin | G01S 5/0289 |
| | | | 370/252 |
| 8,514,131 B2 | 8/2013 | Jovicic et al. | |
| 2006/0019679 A1* | 1/2006 | Rappaport | H04W 64/00 |
| | | | 455/456.5 |
| 2010/0014443 A1* | 1/2010 | Cristian | G01S 5/0289 |
| | | | 370/255 |
| 2010/0130229 A1 | 5/2010 | Sridhara et al. | |
| 2011/0090081 A1 | 4/2011 | Khorashadi et al. | |
| 2011/0250903 A1* | 10/2011 | Huang | G01S 5/0263 |
| | | | 455/456.1 |
| 2012/0133555 A1 | 5/2012 | Hyun | |
| 2013/0018629 A1 | 1/2013 | Sidhu et al. | |
| 2013/0116966 A1* | 5/2013 | D'Jesus Bencci | G01C 21/20 |
| | | | 702/150 |
| 2013/0281111 A1 | 10/2013 | Syrjarinne et al. | |
| 2013/0307723 A1 | 11/2013 | Garin et al. | |
| 2013/0344886 A1 | 12/2013 | Jarvis et al. | |
| 2014/0011518 A1 | 1/2014 | Valaee et al. | |
| 2014/0073363 A1 | 3/2014 | Tidd et al. | |
| 2015/0133152 A1 | 5/2015 | Edge et al. | |
| 2015/0198721 A1 | 7/2015 | Waters et al. | |
| 2015/0237595 A1 | 8/2015 | Le et al. | |

OTHER PUBLICATIONS

Partial International Search Report—PCT/US2015/046389—ISA/EPO—dated Dec. 10, 2015.
International Search Report and Written Opinion—PCT/US2015/046389—ISA/EPO—dated Mar. 10, 2016.
Jimenez A.R., et al., "A Comparison of Pedestrian Dead-Reckoning Algorithms using a Low-cost MEMS IMU," Intelligent Signal Processing, 2009. WISP 2009. IEEE International Symposium on, IEEE, Piscataway, NJ, USA, Aug. 26, 2009 (Aug. 26, 2009), pp. 37-42, XP031546088, ISBN: 978-1-4244-5057-2.

* cited by examiner

MOBILE DEVICE SENSOR AND RADIO FREQUENCY REPORTING TECHNIQUES

FIELD

The subject matter disclosed herein relates generally to processing and transferring of radio signal data and displacement data.

BACKGROUND

A position estimate, which may also be referred to as a position "fix", for a mobile device, may be based at least in part on distances or ranges measured from the mobile station to one or more wireless transmitters in a wireless system. Such systems may include wireless communication systems including, for example, cellular communication systems or wireless local area networks, to name just a couple of example types of wireless communication systems. Wireless communication systems may employ one or more wireless transmitters/receivers that may be referred to as "base stations" or "access points," for example. A position fix is traditionally reliant upon knowledge of positions of the one or more wireless transmitters in the system. Accuracy or availability of mobile device positioning systems may depend, at least in part, on wireless transmitter mapping, wherein information related to wireless transmitters including estimated locations may be stored in a positioning database.

The positioning database may contain various types of information, including, for example, information that may be used in position estimation operations. Positioning databases may contain information related to positioning via radio frequency (RF) signal measurements within a mapped environment. For example, various RF signal characteristics may be measured within an area and leveraged to create various signaling environment characteristic models (e.g., heatmaps). The heatmaps may be maintained and refined over time, and which may allow for location position determination by mobile devices within an indoor structure.

To develop a positioning database for use in mobile device positioning operations, a venue can collect data for the environment with trained system surveyors or operators. For example, a surveyor may physically map out WiFi access points (AP) within an interior of a building and associate measurements with coordinates in a map. Detailed maps of an environment may be required before mapping begins because real-time map generation and tracking may be too processor or bandwidth intensive. Additionally, information collected with traditional single person surveys may be expensive, slow, erroneous, outdated, or missing some AP location information. For example, an AP may be relocated from one location to another or be replaced with a different AP. AP location data collection may pose a significant obstacle to the expansion of mobile device location operations for indoor areas. After a survey of APs is performed, perhaps at a significant cost, the surveying process may need to be repeated on a regular basis to track changes and provide the most up to data AP location information. Such overhead and reliance on professional surveyors in maintaining or setting up a wireless positioning system may result relatively large costs in maintenances or result in unreliable or inaccurate positioning performance.

Alternatively, a group of devices working independently towards a similar goal and with occasional direction from a server (e.g., crowdsourcing) may obtain RF measurements for absolute mobile device positions in a map of an environment. However, crowdsourcing RF measurements for a map typically requires coordinates of the mobile device at specific/absolute positions within the map to be known, so coordinate may be associated with a respective RF signal measurement at that coordinate in the map. However, requiring known coordinates within a map (e.g., absolute position of the mobile device) for RF signal measurements limits the applicability of traditional crowdsourcing of RF measurements for areas of a map where mobile device positioning is often uncertain, such as deep indoors where satellite fixes are unavailable. Therefore, updated techniques for efficiently maintaining or updating a wireless positioning database can help improve the adoption and accuracy of positioning for indoor venues.

SUMMARY OF THE DESCRIPTION

Embodiments disclosed herein may relate to a method for sensor reporting to a server. For example, a method may comprise, at a mobile device: measuring, at a first position of the mobile device, a first radio signal characteristic; obtaining first sensor data comprising a plurality of sensor data points; measuring, at a second position of the mobile device, a second radio signal characteristic; determining a displacement between the second position and the first position based, at least in part, on the first sensor data; and sending, to a server, the displacement, one or more indications representing one or both of the first radio signal characteristic and the second radio signal characteristic.

Embodiments disclosed herein may relate to a mobile device for sensor reporting to a server. For example, a mobile device may comprise: a sensor; a wireless subsystem; and a processor coupled to the sensor and the wireless subsystem. The processor may, for example, be configured to: measure, at a first position of the mobile device, a first radio signal characteristic for a first radio signal acquired via the wireless subsystem; obtain, via the sensor, first sensor data comprising a plurality of sensor data points; measure, at a second position of the mobile device, a second radio signal characteristic for a second radio signal acquired via the wireless subsystem; determine a displacement between the second position and the first position based, at least in part, on the first sensor data; and send, to a server via the wireless subsystem, the displacement, and one or more indications representing one or both of the first radio signal characteristic and the second radio signal characteristic.

Embodiments disclosed herein may relate to an apparatus for use in a mobile device for sensor reporting to a server. For example, an apparatus may comprise: means for measuring, at a first position of the mobile device, a first radio signal characteristic; means for obtaining first sensor data comprising a plurality of sensor data points; means for measuring, at a second position of the mobile device, a second radio signal characteristic; means for determining a displacement between the second position and the first position based at least in part, on the first sensor data; and means for sending, to a server, the displacement, one or more indications representing one or both of the first radio signal characteristic, and the second radio signal characteristic.

Embodiments disclosed herein may relate to an article of manufacture comprising a non-transitory machine readable storage medium comprising program instructions that are executable by a processor of a mobile device to: measure, at a first position of the mobile device, a first radio signal characteristic; obtain first sensor data comprising a plurality of sensor data points; measure, at a second position of the mobile device, a second radio signal characteristic; determine a displacement between the second position and the first position based, at least in part, on the first sensor data; and send, to a server, the displacement, one or more indications representing one or both of the first radio signal characteristic and the second radio signal characteristic.

Other features and advantages will be apparent from the accompanying drawings and from the detailed description.

DESCRIPTION

Wireless transmitters in a venue may be installed or removed ad hoc or as needed. Positioning databases containing positions of wireless transmitters (e.g., WiFi access points, Bluetooth devices, or other radio frequency (RF) signal sources) within an environment can benefit from the most up to date wireless transmitter position information. Mobile devices having known within the environment (e.g., coordinates within a map) can be crowdsourced to gather characteristics from RF signals (also referred to herein as simply radio signals). A server can process the crowdsourced RF signal characteristics taken at various mobile device positions in order to maintain/update the wireless transmitter positioning database. However, when mobile device absolute position is unknown, the mobile device may send representations (e.g., a displacement vector) of mobile device sensor data instead of the absolute mobile device position where the RF signal measurements were performed.

In one embodiment, mobile devices with unknown absolute position within a location leverage their mobile device sensors (e.g., motion sensors) to determine relative displacement between two or more RF signal measurements. The RF signal characteristics resulting from the measurements from wireless transmitters at an unknown absolute location (for example, within a mapped coordinate system) may be sent to a server for processing. The mobile device displacement data may include distance and angle traversed by the mobile device over a period of time (e.g., displacement vectors). In one embodiment, the displacement data is transmitted to a server with the two or more RF signal measurements. The RF signal measurements and the displacement data may be used by the server to aid in determining position of wireless transmitters in an environment.

Figure 1A:
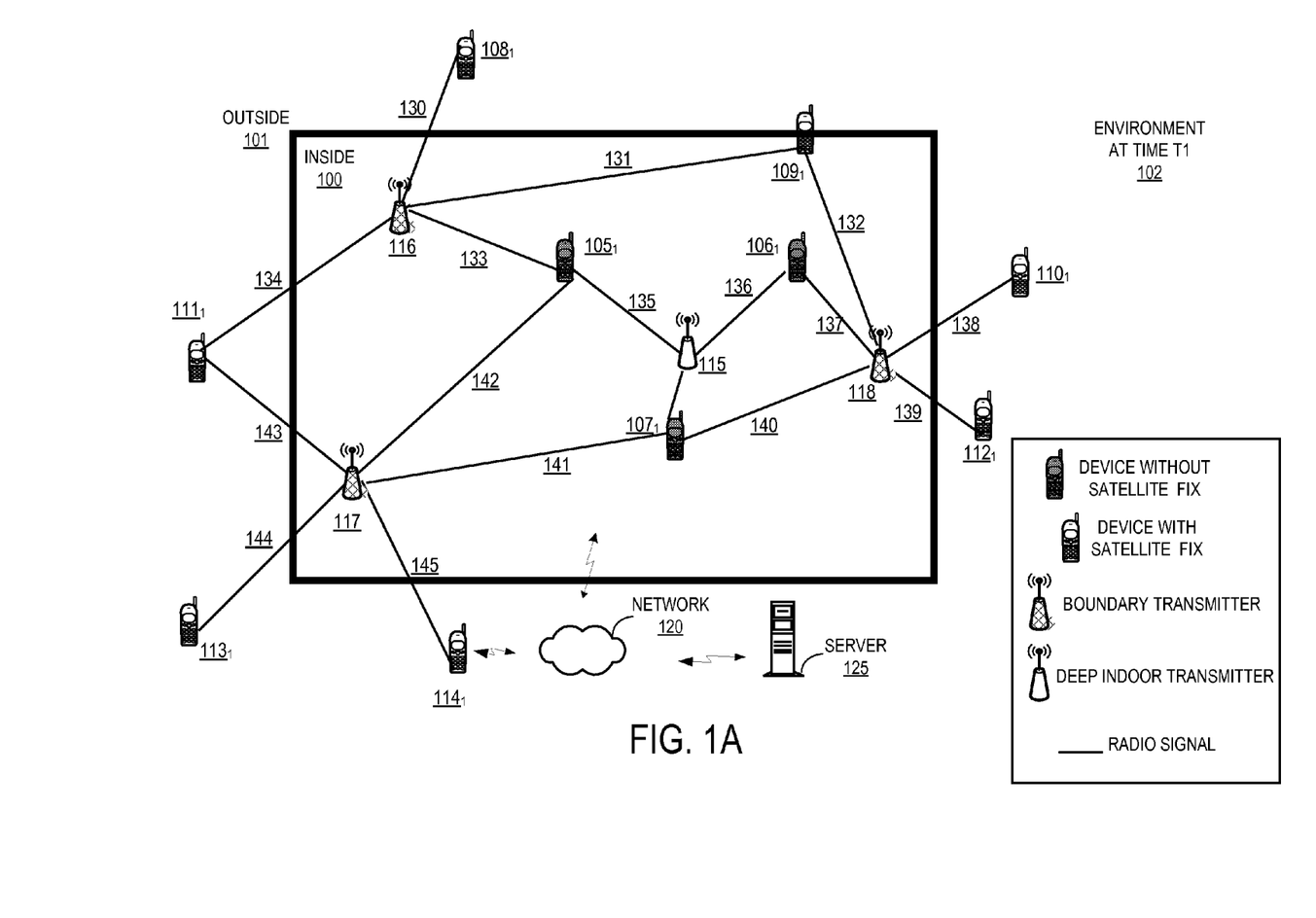
FIG. 1A is block diagram illustrating an environment for crowdsourcing data from mobile devices at a first moment in time, in one embodiment.

FIG. 1A is block diagram illustrating an environment (described herein as the "location") for crowdsourcing data from mobile devices at a first moment in time, in one embodiment. The environment may include one or more inside areas (e.g., inside area 100) and outside areas (e.g., outside area 101). Inside area 100 may be an enclosed space where a global navigation satellite system (GNSS) may be unreliable or inaccessible to mobile devices within the inside area 100. For example, inside area 100 may be a venue such as a shopping mall, office space, or other building or structure. The environment may also include an outside area 101. Outside area 101 may be an open or unobstructed location.

The environment of FIG. 1 includes a wireless communication network (e.g., network 120) including, for example, cellular communication systems or wireless local area networks. Wireless communication systems may employ one or more wireless transmitters/receivers (e.g., wireless transmitters 115-118) that may be referred to as "base stations" or "access points," for example. As used herein, the terms "base station" and "access point" represents types of wireless transmitters, although the scope of claimed subject matter is not limited in this respect. As used herein, the term "transmitter" is meant to include any transmitter or transmitter/receiver of wireless signals compatible with any type of wireless communication system. For example, a transmitter may be Bluetooth device transmitting over a protocol defined by the trade organization Bluetooth SIG. The term "transmitter" is also meant to include any wireless communication station or device utilized to facilitate communication in a wireless communications system, such as, for example, a cellular network, although the scope of claimed subject matter is not limited in this respect. An example type of wireless transmitter utilized in a cellular network may be referred to as a base station. In another aspect, a wireless transmitter may comprise a femtocell, utilized to extend cellular telephone service into a business or home, for example. In such an implementation, one or more mobile devices may communicate with a femtocell via a code division multiple access (CDMA) cellular communication protocol, for example, and the femtocell may provide the mobile device access to a larger cellular telecommunication network by way of another broadband network such as the Internet. In another aspect, wireless transmitters may be included in any of a range of electronic device types.

In one embodiment, a wireless transmitter may comprise a wireless local area network (WLAN) access point (AP), for example. Such a WLAN may comprise a network that is compatible with one or more of the IEEE 802.11x standards (e.g., 802.11n, 802.11ac, 802.11ax, etc.), although the scope of claimed subject matter is not limited in this respect. Additionally, the use herein of the term "transmitter" in describing a device does not limit that device's function to transmitting only. For example, base stations and access points are typically capable of both transmitting and receiving wireless signals.

As used herein, transmitters initially discovered have unknown locations (e.g., the transmitter location within a predetermined map or global coordinate system is unknown). Although transmitters position may be initially unknown, server 125 can process the RF signal characteristics from transmitters with mobile device positioning data to ultimately determine transmitter positions.

The environment illustrated in FIG. 1 also includes mobile devices (e.g., mobile devices 105-118). Mobile devices in the environment can process, in real-time, motion data from sensors to estimate a relative displacement from a relative starting position, to a relative initialized starting position. Concurrently with processing motion data from sensors, the mobile device can measure characteristics of received RF signals of nearby wireless transmitters. The mobile device may identify nearby wireless transmitters by their broadcast identification (e.g., MAC address) and associate each RF signal characteristic with the respective mobile device displacement. Radio signal characteristics may include for example, time of arrival (TOA), time difference of arrival (TDOA), round trip time (RTT), or received signal strength indicator (RSSI), or any combination thereof. In one embodiment, a server processes radio signal characteristics to determine a range measurement from the mobile device to the radio signal source (e.g., transmitter).

As used herein, the term "mobile device" refers to a device (e.g., user equipment, access terminal, etc.) that may from time to time have a position that changes. Such changes in position may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, wearable device or other portable communication devices. A mobile device may also comprise a processor or computing platform adapted to perform functions controlled by machine-readable instructions. The mobile device may have positioning capability (e.g., Wi-Fi positioning, sensors, GNSS, etc.) to determine the absolute position of the mobile device at specified time intervals. Absolute position estimate of the mobile device, may be referred to as a position "fix", for a mobile device may be obtained based at least in part on GNSS. In some embodiments, GNSS is unavailable and the mobile device leverages sensors to track relative displacement. Further details of the components and features of an exemplary mobile device are described below with reference to FIG. 3.

As used herein, the mobile device may sometimes be unable to determine the absolute position of the mobile device as well as transmitters within the location. In one embodiment, as the mobile device traverses the location, transmitters are discovered and measurements are obtained in order to develop knowledge of the transmitters position relative to the position of the mobile device.

The term "unknown" as used herein in connection with a position of a mobile device or a position of a wireless transmitter refers to a position that has yet to be measured or estimated with a level of accuracy sufficient for a given application. For example, a mobile device to determine absolute location or coordinates of itself or a wireless transmitter within a map to have a "known" position. Estimated or measured relative positions within several meters may be considered to be "known" relative positions, although the scope of claimed subject matter is not limited in this respect. In some embodiments, a mobile device or transmitter may initially have an "unknown" absolute and relative position. In response to the mobile device's receipt of GNSS satellite data, the mobile device may determine position coordinates within a map and the mobile device's absolute position status may become "known" for that moment in time or until the mobile device changes to a position where GNSS or other absolute positioning technique is unavailable.

Figure 1B:
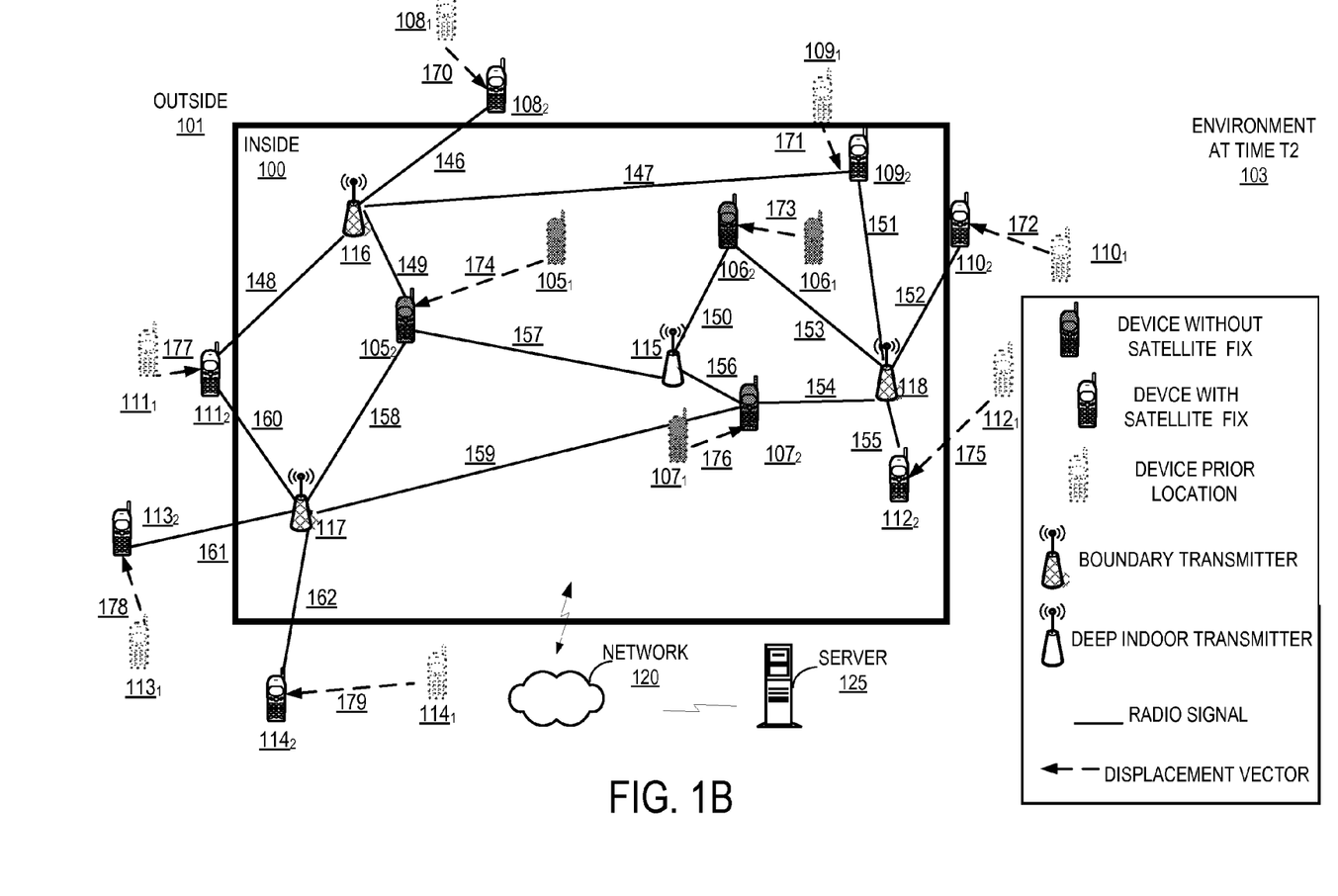
FIG. 1B is block diagram illustrating an environment for crowdsourcing data from mobile devices at a second moment in time occurring after the moment illustrated in FIG. 1A, in one embodiment.

As illustrated in FIG. 1A, mobile devices within the environment at time T1 102 may have an absolute position (e.g., a known position), or may be unable to determine absolute position (e.g., position unknown). For example, a mobile device deep inside a building may be outside of range of receipt for GNSS satellite signals. As illustrated in FIGS. 1A and 1B, absolute position is determined by GNSS satellite fix and availability of the GNSS satellite fix is related to the mobile devices respective position within an indoor environment (e.g., inside area 100). In other embodiments, absolute position may be determined by other techniques.

Mobile devices $108_1$-$114_1$ with a GNSS satellite fix at time T1 can determine their respective absolute position within their environment (e.g., coordinates within a venue map). Mobile devices $108_1$-$114_1$ can measure nearby RF signals (e.g., RF signals 130-145) from wireless transmitters (e.g., boundary transmitters 116-118) and send the RF signal characteristics with their respective measurement positions (e.g., the positions occupied by mobile devices $108_1$-$114_1$ at time T1 illustrated in FIG. 1A) to a server (e.g., server 125). The server may be a positioning server or a dedicated crowdsourcing server for processing transmitter positions into an updated positioning database.

Equation 1 below represents one embodiment of a joint optimization performed by the server (e.g., server 125) that receives GNSS data and RF signal characteristics from mobile devices (ATs) in the environment 102. The joint optimization of Equation 1 can produce an estimate of wireless transmitter (AP) position.

$$\underset{x_j, x_i, \delta_i}{\operatorname{argmin}} \left( \sum_{AP=j} \frac{\|x_j - \mu_j\|^2}{\sigma_j^2} + \sum_{AP=i \leftrightarrow AT=j} \frac{(\|x_j - x_i\| + \delta_i - t_{ij})^2}{\tau_i^2} \right) \quad \text{Eq. 1}$$

With regards to Equation 1, $x_j$ represents the location of the mobile device, $\mu_j$ represents a GNSS fix, $\sigma_j$ represents a reliability (e.g., standard deviation) of $\mu_j$. The second term of Equation 1 represents the wireless transmitter measurements. For example, $x_j$-$x_i$ represents the distance between the ith wireless transmitter and the jth mobile device, $t_{ij}$ represents the RF signal characteristic (e.g., RTT, RSSI, etc.) between wireless transmitter i and mobile device j. With respect to Equation 1, $\delta_i$ represents the RF signal processing delay, and $\tau_i$ represents the uncertainty of the RF signal characteristic (e.g., standard deviation).

Deep indoor transmitters (e.g., transmitter 115) may not be mapped within the positioning database with traditional techniques because absolute mobile device position is unknown when RF signal characteristics associated with the deep indoor transmitters are measured and sent to the server. Therefore, a typical crowdsourcing server may be unable to estimate deep indoor wireless transmitter's (e.g., transmitter 115) position without also receiving the absolute coordinates of the mobile device at the time the RF signal characteristics were measured.

Mobile devices $105_1$-$107_1$ are illustrated as deeper within the inside area 100 of environment 102 than mobile devices $108_1$-$114_1$. Therefore, due to satellite reception blocking, mobile devices $105_1$-$107_1$ may have an unknown absolute location (e.g., the mobile devices $105_1$-$107_1$ are without a satellite fix or other source for determining absolute position/map coordinates). In some embodiments, the position fix for mobile devices may be unknown because a GNSS is not installed, not an available feature of the mobile device or deactivated/suspended by an application or user, or GNSS is unreliable (for example, satellite transmission signals are obscured).

In one embodiment, multiple independent user devices (e.g., mobile devices $105_1$-$107_1$) traverse an indoor environment (e.g., environment illustrated by FIGS. 1A and 1B) while processing their local mobile device sensor data to determine displacement (e.g., displacement data, segment, or vector) between two points in time (e.g., a start point and an end point). For example, mobile devices may process data from an accelerometer and a gyroscope to perform dead reckoning distance estimation along a trajectory. In one embodiment, the relative distance traveled by a mobile device in between starting and ending points is processed to determine the displacement of the mobile device.

FIG. 1B is block diagram illustrating an environment for crowdsourcing data from mobile devices at a second moment in time occurring after the moment illustrated in FIG. 1A, in one embodiment. For example, at time T2, mobile devices are shown at a new position different from their starting positions represented in FIG. 1A at time T1. At time T2 (e.g., illustrated by environment at time T2 103), each mobile device performs another (e.g., second) RF signal measurement. In one embodiment, the signals 146-162 are processed (e.g., as a second RF signal measurement) at the mobile device concurrently with completing the displacement estimate at time T2. In one embodiment, the displacement data (e.g., the displacement segment or vector) for each mobile device between time T1 and time T2 may be saved to the mobile device and uploaded through network 120 to a server 125 for further processing.

In some embodiments, mobile devices may send representations of raw mobile device sensor data between time T1 and T2 to the server instead of or in addition to displacement segments or vectors. For example, a heading and number of steps traveled by the user holding the mobile device may be used to determine the displacement vector at the mobile device or the server. In some embodiments, the mobile device sends the number of steps and the heading data directly to the server so the server can produce the respective displacement vector.

In some embodiments, mobile devices can determine if the mobile device displacement is less than a threshold distance. If the mobile device displacement is less than a threshold distance, the mobile device or server may average the two or more radio signal characteristics determined to be within the threshold distance. For example, if a mobile device is within a same approximate position at the start point as the end point, the RF signal characteristics measured at the two points are averaged together and sent as a single average RF signal characteristic.

In some embodiments, the mobile device determines one or more reliability characteristics for the displacement segment and sends the reliability determination or the determined reliability characteristics to the server. In one embodiment, the number or frequency of mobile device turns during a displacement segment is measured as a reliability characteristic. In one embodiment, the mobile device obtains second sensor data from a gyroscope to determine turns or orientations changes in the trajectory of the mobile device. A greater number or frequency of turns (e.g., beyond a configurable threshold number) may be an indicator of tracking errors and may be flagged as a less reliable displacement vector or segment.

In one embodiment, reliability characteristics may include time elapsed while reading a respective sensor data. For example, RF signal measurements may be determined with set intervals, or in some embodiments, may be determined at random or varied intervals such that a longer time has passed between RF signal measurements. Displacement data may be considered less reliable the greater the time that passes compared to RF signal measurements that are closer in time. In some embodiment, RF signal measurements may be captured by a separate application, process, engine, or module than what is providing the crowdsourced data to the server. For example, a navigation app on a smartphone may have permissions to share RF signal characteristics with the crowdsourcing features described herein. Therefore, receipt of RF signal characteristics may be outside of the control of the crowdsourcing aspect described herein, and reliability measurements of the time in between RF signal characteristics can be beneficial.

In one embodiment, reliability characteristics may include configurable threshold distance traveled by the mobile device while reading a respective sensor data. For example, mobile sensors (e.g., accelerometer, gyroscope, etc.) can introduce tracking errors that compound over time/distance.

In one embodiment, reliability characteristics may include mobile device steadiness while reading a respective sensor data. For example, swinging the device or changing the orientation of the device during sensor data collection may negatively affect displacement vector or segment calculations.

In some embodiments, each reliability characteristic may be measured and the measurement may be sent to a server for processing with other data (e.g., displacement vectors or segments, RF signal measurements, etc.). In some embodiments, reliability characteristics may be a binary flag such that detection of a particular characteristic is reported to the server. For example, detecting swinging of the device may result in a reliability flag sent to the server with other reporting data that marks the displacement data as potentially less trustworthy or reliable. As another example, when distance or time surpasses a threshold value a flag may be triggered and sent to the server. For example, segments longer than 3 seconds may be flagged for reliability, or threshold distances greater than 10 feet may be flagged. Many alternative and customizable threshold values can be set for the various reliability characteristics described herein. Many types of reliability characteristics and combinations for flags may be possible and every type and combination is not described here in its entirety.

Figure 1C:
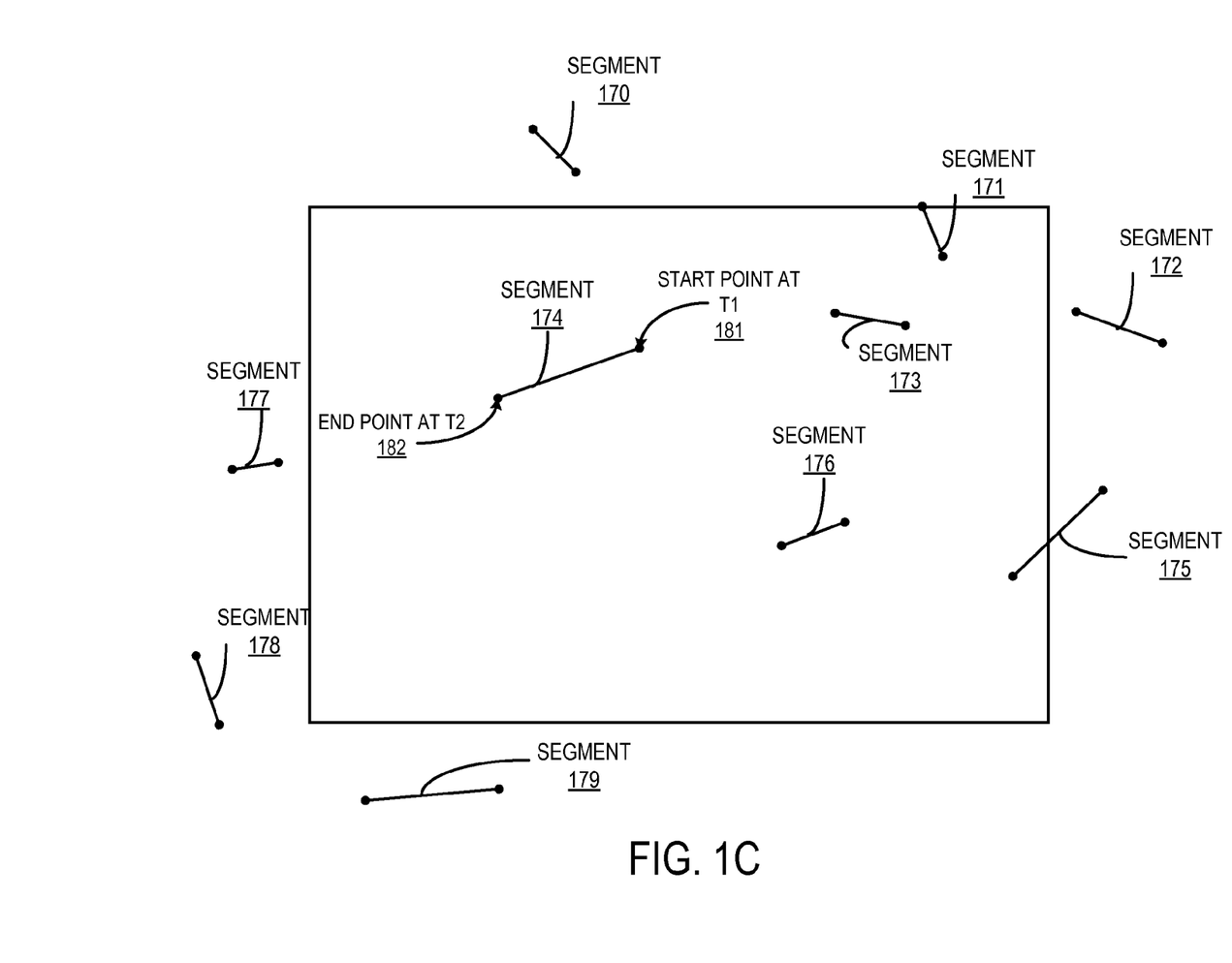
FIG. 1C is block diagram illustrating a group of individual displacement segments or vectors according to start points from FIG. 1A and end points from FIG. 1B, in one embodiment.

FIG. 1C is block diagram illustrating a group of individual displacement segments or vectors according to start points from FIG. 1A and end points from FIG. 1B, in one embodiment. In one embodiment, the start and end points comprising a displacement segment are triggered by RF signal measurements. For example, a first RF signal measurement can trigger the start of a displacement segment and the second RF signal measurement can trigger the end of the respective displacement segment. RF signal measurements may be sampled infrequently compared to motion sensor sampling to enable power savings in mobile devices compared to performing continuous RF signal measurements throughout a mobile device trajectory. For example, an accelerometer may be sampled at 50 Hz compared to a RF signal measurement performed every 3 seconds.

Each segment (e.g., segments 170-179) illustrates a change in position derived motion sensor data from start and end points at time T1 and T2 respectively. For example, displacement segment 174 may represent a distance estimated from processing motion sensor data from time T1 at start point 181 up until end point at T2 182. Start point 181 at T1 may be triggered or initiated by a measuring RF signal 133 by mobile device $105_1$ at time T1 illustrated in FIG. 1A. The end point 182 of the segment 174 may be determined by measuring RF signal 149 by mobile device $105_2$ at time T2 illustrated in FIG. 1B. Displacement segments represent a direct line from the start point to the end point and may not represent an actual trajectory traveled by the mobile device during the time between T1 and T2. For example, a mobile device may take a circuitous path from its start point to its end point. In one embodiment, regardless of the actual trajectory traveled by the mobile device, the most direct line from the start point to the end point (e.g., displacement vector) is sent to the server for processing and wireless transmitter positioning determination.

In one embodiment, the displacement segments or vectors and associated RF signal characteristics are sent to the server for processing. Each mobile device within an environment may asynchronously (with respect to other mobile devices) send their respective displacement segment and RF signal characteristics to the server and the server may process the received data at some later time (e.g., at intervals or within a scheduled processing window). The server can calculate an estimated wireless transmitter position for deep indoor transmitters without absolute mobile device positioning. For example, Equation 2 shown below expands upon Equation 1 to include captured mobile device sensor data (e.g., displacement data) from mobile devices with unknown absolute position. With reference to Equation 2, displacement data $d_{i-i'}$ is matched to $x_{i'}-x_i$ in order to estimate wireless transmitter position and $\eta_{i-i'}^2$ represents the uncertainty of the mobile device displacement data (e.g., steadiness, total distance travelled, frequency of turns, time elapsed, or other reliability indicators etc. as described above).

$$\operatorname*{argmin}_{x_j, x_i, \delta_i} \left( \sum_{AT=j} \frac{\|x_j - \mu_j\|^2}{\sigma_j^2} + \sum_{AP=i \leftrightarrow AT=j} \frac{(\|x_j - x_i\| + \delta_i - t_{ij})^2}{\tau_i^2} + \sum_{AT=i \leftrightarrow AT=i'} \frac{(\|x_{i'} - x_i\| - d_{i-i'})^2}{\eta_{i-i'}^2} \right) \quad \text{Eq. 2}$$

Figure 2A:
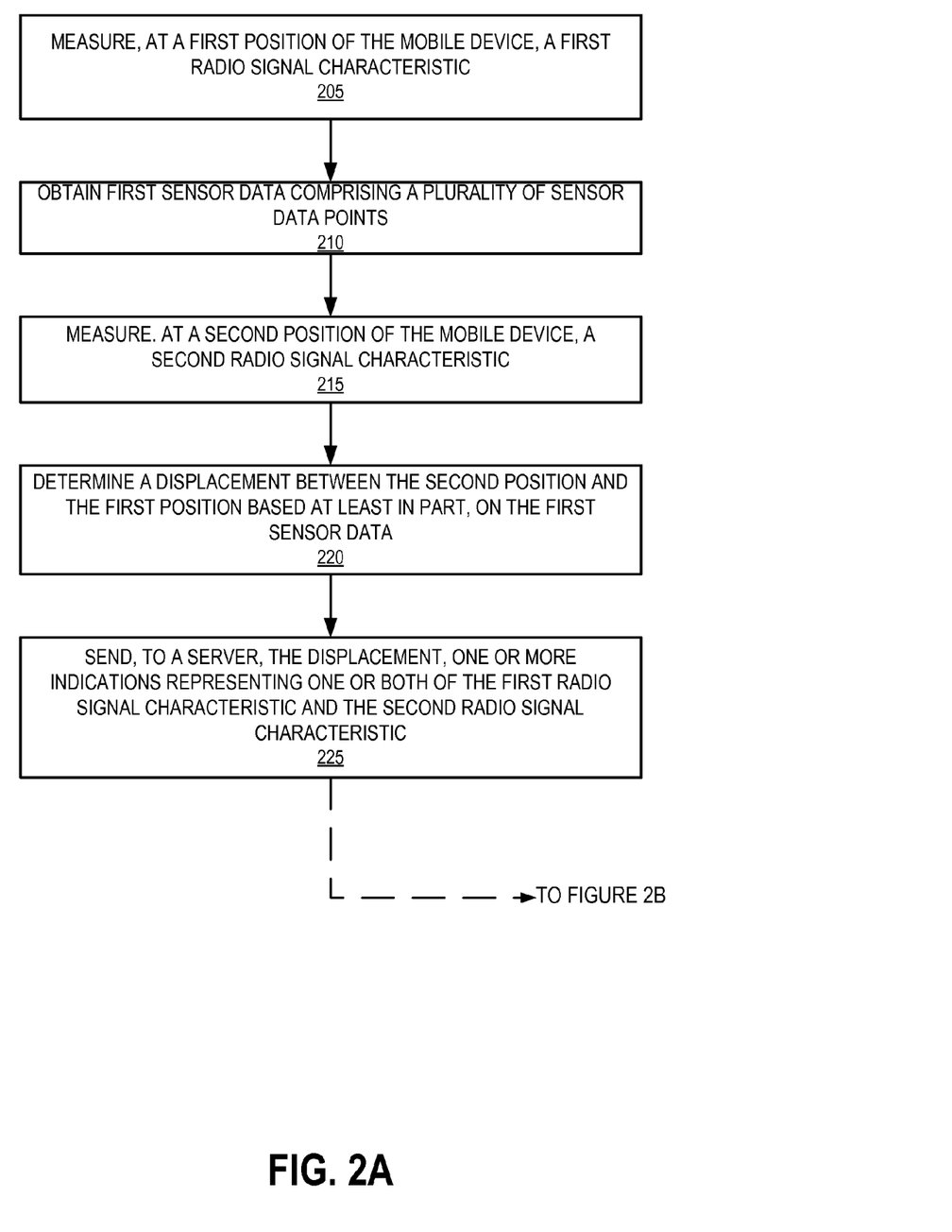
FIG. 2A is a flow diagram illustrating a method for sensor reporting by a mobile device, in one embodiment.

FIG. 2A is a flow diagram illustrating a method for sensor reporting by a mobile device, in one embodiment. At block 205, a mobile device at a first position measures a first radio signal characteristic. In one embodiment, the first position of the mobile device may be an initialized arbitrary position to a reference set of coordinates. In some embodiments, the mobile device references a last known GNSS position as an initial reference position of the mobile device. In some embodiments, absolute position of the mobile device is unknown and the first position is a relative starting position.

At block 210, the mobile device obtains a first sensor data comprising a plurality of sensor data points. For example, the first sensor data may be a constant stream from an accelerometer or sensor data may be stored in memory or a file on the mobile device. In some embodiments, the mobile device reads from other/additional sensor data sources (e.g., magnetometer, a gyroscope, barometer, or other sensors). In some embodiments, the mobile device concurrently reads from a second sensor data different than the first data. In some embodiments, data from the sensor is used to detect a change in orientation or a turn degree from one position to the next position. For example, a gyroscope may detect a change in direction such as turning a corner.

At block 215, the mobile device at a second position measures a second radio signal characteristic. For example, at some predetermined (e.g., through a configuration setting) time after measuring the first radio signal, the mobile device measures an another/subsequent RF signal characteristic. In some embodiments, triggering the second radio signal measurement defines the end point of a displacement segment to send to the server. As described above related to block 205, the starting point may be the first data point for a respective mobile device sensor for the respective segment. For example, the first segment may be a segment of mobile device motion sensor data beginning in response to a first radio signal measurement, and ending with a second radio signal measurement.

At block 220, a displacement between the second position and the first position based at least in part, on the first sensor data is determined at the mobile device. For example, through pedestrian dead reckoning, the mobile device may process accelerometer (or other sensor data) to estimate distance traveled. In some embodiments, the mobile device may use an arbitrary starting position as a baseline for pedestrian dead reckoning to determine the current position of the mobile device. In other embodiments, a GNSS location may be determined and utilized as the first or starting position as a baseline for pedestrian dead reckoning. In response to tracking the trajectory of a mobile device from the first to the second position, displacement may be determined. For example, if the user walks in a circle to arrive at the same point, the total displacement would be zero. If the user walks in less than a straight line from the first position to the second position the displacement may be a distance less than the total distance traveled by the mobile device.

At block 225, the mobile device sends the displacement, one or more indications representing one or both of the first radio signal characteristic, and the second radio signal characteristic to a server. The mobile device can process motion sensor data from a first to a second point in time and send the processed data to the server with the associated RF signal measurements. For example, data from an accelerometer (e.g., user steps) may indicate total distance traveled. The RF signal measurements (e.g., at the start and end points) and associated displacement data may be bundled together in a single package or container, or alternatively may be linked together as part of a larger dataset with multiple measurements and positions.

In some embodiments, the indications representing radio signal characteristics may be a form of RSSI, TOA, TDOA, or RTT values. In some embodiments, the mobile device may send a form of raw RF signal measurement as a characteristic and the server may process the RF signal measurement to determine RSSI, TOA, TDOA, or RTT. In some embodiments, the mobile device may determine that the second position is within a threshold distance from the first position and average the first radio signal characteristic with the second radio signal characteristic as the indication representing the first and second radio signal characteristics.

Optionally, after block 225, the mobile device may perform additional embodiments as described in relation to FIG. 2B below.

Figure 2B:
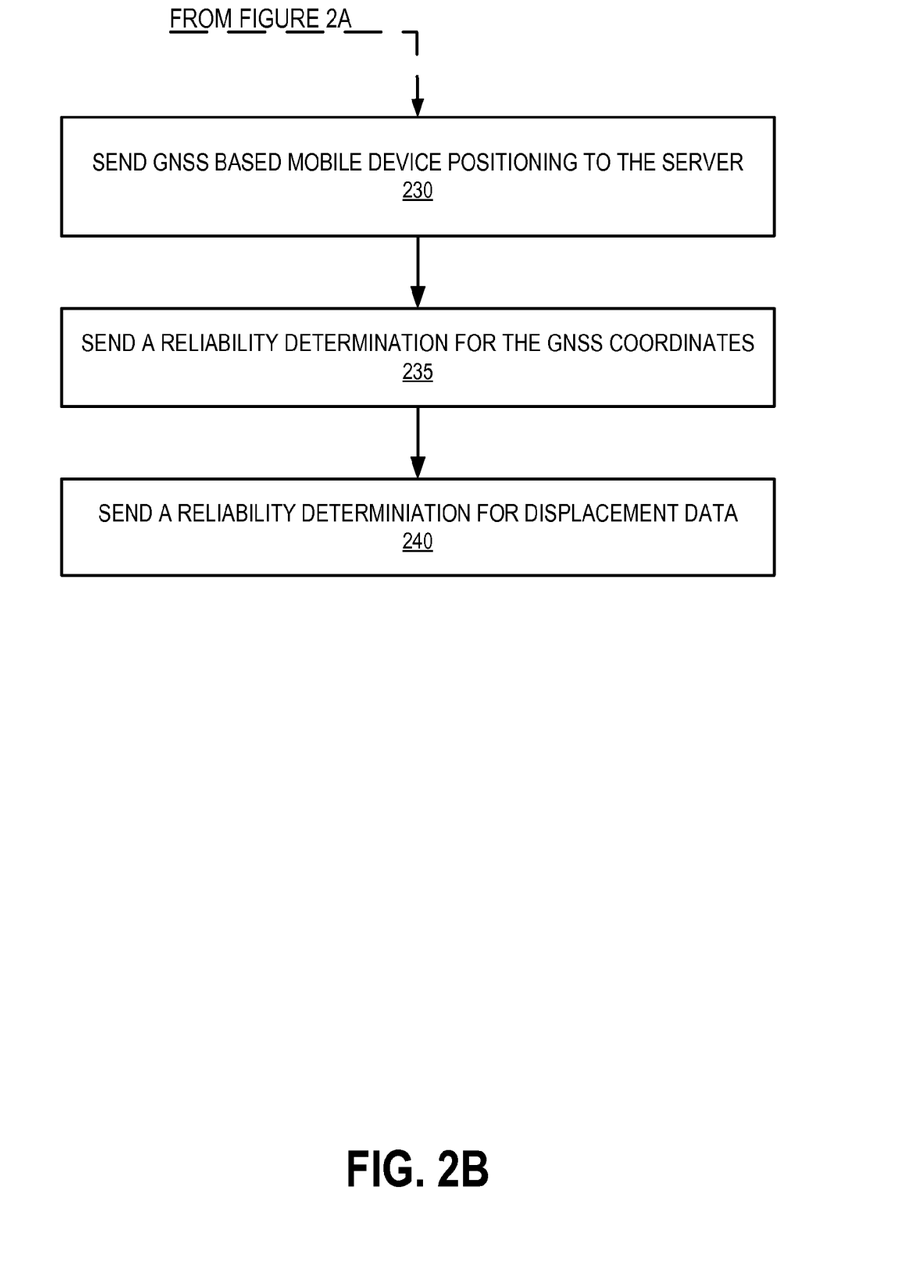
FIG. 2B is a flow diagram illustrating a method for sensor reporting by a mobile device, in another embodiment.

FIG. 2B is a flow diagram illustrating a method for sensor reporting by a mobile device, in another embodiment. At block 230, the mobile device sends GNSS based mobile device positioning to the server for processing. In some embodiments, a mobile device may have intermittent or occasional access to GNSS satellite fixes. A mobile device may be able to determine at least one coordinate (e.g., x or y in an x-y coordinate system) of the position of the mobile device. For example, even while a mobile device is inside a building the mobile device may pass in front of a window or opening to allow GNSS satellite fix (e.g., GNSS based coordinate of the position within a map) to provide the mobile device with one or more coordinates representing an absolute position. GNSS coordinates (also referred to herein as GNSS based positioning data) may be determined at any point during the mobile sensor trajectory tracking. In one embodiment, partial or incomplete GNSS data may be sent with displacement of the mobile device between two RF signal characteristics as described in other embodiments herein. For example, some mobile devices may send displacement data and RF signal characteristics without any associated GNSS data, while other mobile devices may send displacement data and RF signal characteristics with partial or complete GNSS data (e.g., one or more satellite position fixes at one or more coordinates along the mobile device trajectory).

At block 235, the mobile device sends a reliability determination for the GNSS satellite fix. For example, GNSS based mobile device positioning may be determined with line of sight to at least four satellites, however additional satellite fixes may improve accuracy of positioning.

At block 240, the mobile device sends reliability determination associated with the displacement data determined at block 220. For example, the reliability determination may be based on reliability characteristics such as steadiness, total distance travelled, frequency of turns, time elapsed, or other reliability indicators as introduced above.

Figure 2C:
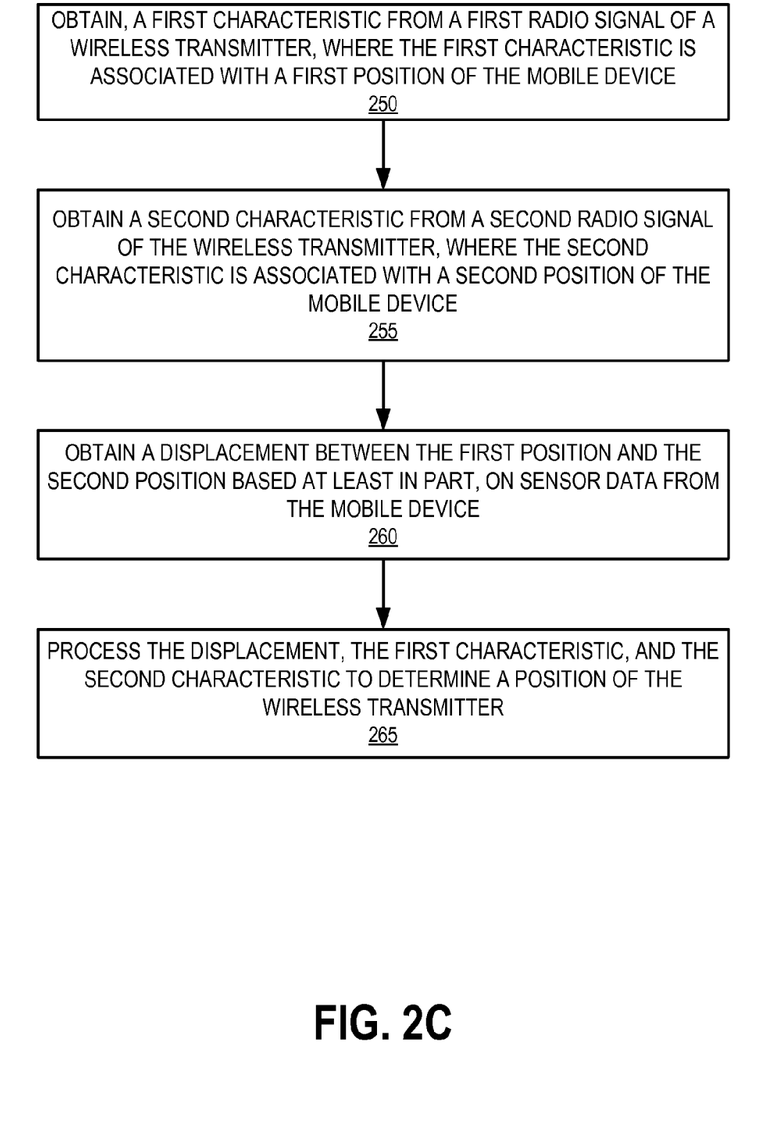
FIG. 2C is a flow diagram illustrating a method for processing sensor reported by a mobile device, in one embodiment.

FIG. 2C is a flow diagram illustrating a method for processing sensor reported by a mobile device, in one embodiment. At block 250 the server obtains a first characteristic from a first radio signal of a wireless transmitter, where the first characteristic is associated with a first position of a mobile device. For example, the first radio signal characteristic may be one or more of: a time of arrival (TOA), a time difference of arrival (TDOA), round trip time (RTT), a received signal strength indicator (RSSI), or any combination thereof, corresponding to the radio signal.

At block 255, the server obtains, from the mobile device, a second characteristic from a second radio signal of the wireless transmitter, wherein the second characteristic is associated with a second position of the mobile device.

At block 260, the server obtains, from the mobile device, a displacement between the first position and the second position based at least in part, on sensor data from the mobile device. In some embodiments, the server also obtains, from the mobile device, one or more reliability characteristics associated with the displacement and determines a reliability of the displacement according to the one or more reliability characteristics.

At block 265, the server processes the displacement, the first characteristic, and the second characteristic to determine a position of the wireless transmitter. In some embodiments, the server processes the displacement and RF characteristics according to the reliability characteristics received from the mobile device (e.g., Equation 2 above).

Figure 3:
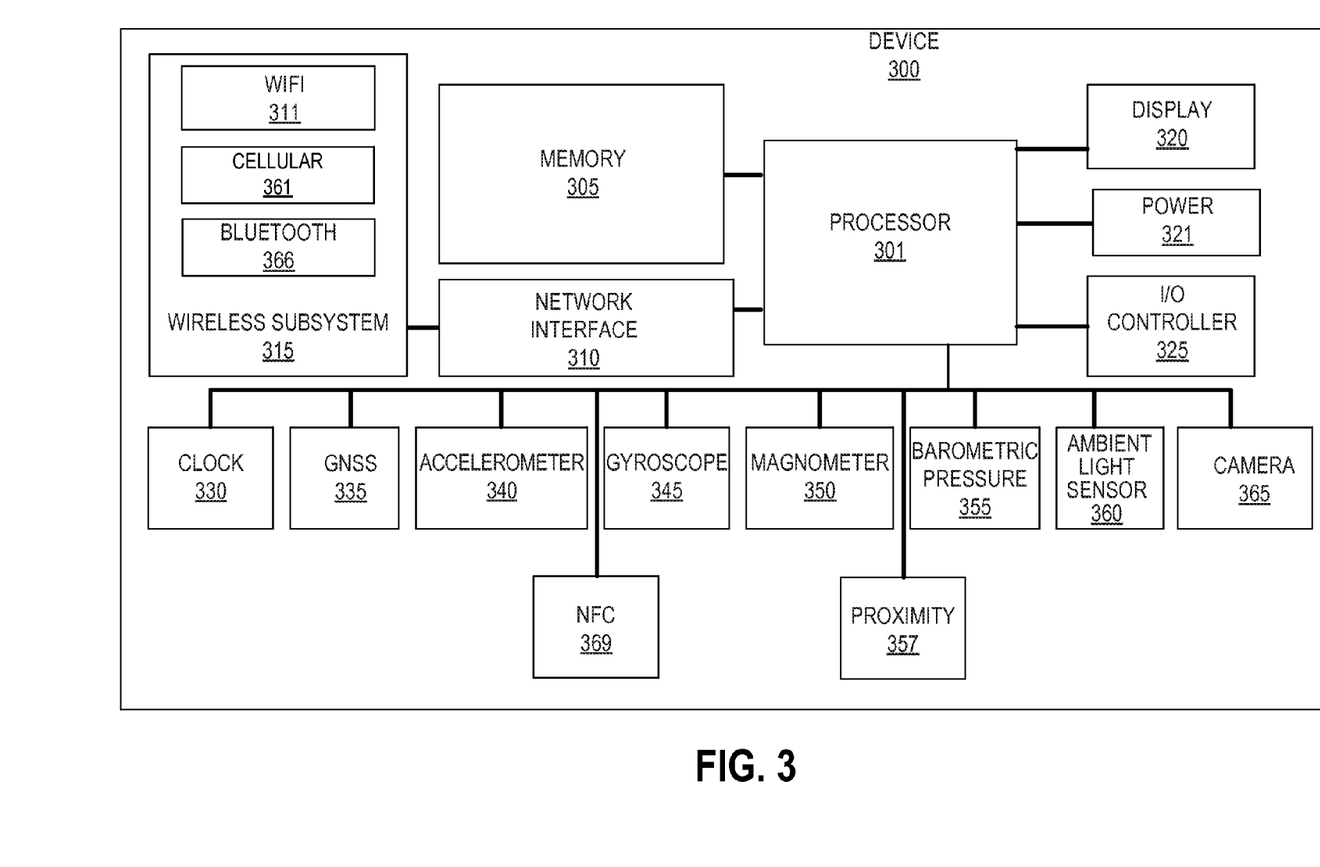
FIG. 3 is block diagram illustrating a device to gather and send data for crowdsourcing, in one embodiment.

FIG. 3 is block diagram illustrating a device to implement described embodiments. In some embodiments, device 300 may be a server (e.g., server 125) or a mobile device (e.g., mobile devices 105-114). Device 300 may include one or more processors 301, a memory 305, I/O controller 325, and network interface 310. Device 300 may also include a number of device sensors coupled to one or more buses or signal lines further coupled to the processor 301. It should be appreciated that device 300 may also include a display 320, a user interface (e.g., keyboard, touch-screen, or similar devices), a power device 321 (e.g., a battery), as well as other components typically associated with electronic devices. In some embodiments, device 300 may be a mobile or non-mobile device.

Device 300 can include sensors such as an accelerometer sensor 340, gyroscope sensor 345, magnetometer sensor 350, barometric pressure sensor 355 (e.g., barometer), proximity sensor 357, ambient light sensor (ALS) 335, and camera sensor 365. In some embodiments, device 300 may also include clock 330, near field communication (NFC) 369, compass, and GNSS (e.g., Global Positioning Sensor (GPS)) 335. As used herein a microphone, and/or the wireless subsystem 315 (Bluetooth 366, WiFi 311, cellular 361) may also be considered sensors used to analyze the environment (e.g., position) of the device. In some embodiments, multiple cameras are integrated or accessible to the device. For example, a mobile device may have at least a front and rear mounted camera. In some embodiments, other sensors may also have multiple installations or versions.

Memory 305 may be coupled to processor 301 to store instructions for execution by processor 301. In some embodiments, memory 305 is non-transitory. Memory 305 may also store one or more engines or modules to implement embodiments described below. Memory 305 may also store data from integrated or external sensors. In addition, memory 305 may store application program interfaces (APIs) for accessing the crowdsourcing functionality described herein. In some embodiments, the crowdsourcing functionality can be implemented in memory 305. In other embodiments, crowdsourcing functionality can be implemented as a module separate from other elements in the device 300. The module may be wholly or partially implemented by other elements illustrated in FIG. 3, for example in the processor 301 and/or memory 305, or in one or more other elements of device 300.

Network interface 310 may also be coupled to a number of wireless subsystems 315 (e.g., Bluetooth 366, WiFi 311, Cellular 361, or other networks) to transmit and receive data through a wireless link to/from a wireless network, or may be a wired interface for direct connection to networks (e.g., the Internet, Ethernet, or other wireless systems). Device 300 may include one or more local area network transceivers connected to one or more antennas. The local area network transceiver comprises suitable devices, hardware, and/or software for communicating with and/or detecting signals to/from a wireless access point, and/or directly with other wireless devices within a network. In one aspect, the local area network transceiver may comprise a WiFi communication system suitable for communicating with one or more wireless access points.

Device 300 may also include one or more wide area network transceiver(s) that may be connected to one or more antennas. The wide area network transceiver comprises suitable devices, hardware, and/or software for communicating with and/or detecting signals to/from other wireless devices within a network. In one aspect, the wide area network transceiver may comprise a CDMA communication system suitable for communicating with a CDMA network of wireless base stations; however in other aspects, the wireless communication system may comprise another type of cellular telephony network or femtocells, such as, for example, TDMA, LTE, Advanced LTE, WCDMA, UMTS, 4G, or GSM. Additionally, any other type of wireless networking technologies may be used, for example, WiMax (802.16), Ultra Wide Band, ZigBee, wireless USB, etc. In conventional digital cellular networks, position capability can be provided by various time and/or phase measurement techniques. For example, in CDMA networks, one position determination approach used is Advanced Forward Link Trilateration (AFLT). Using AFLT, a server may compute its position from phase measurements of pilot signals transmitted from a plurality of base stations.

Thus, device 300 may be a: mobile device, wireless device, cell phone, personal digital assistant, mobile computer, server, wearable device (e.g., head mounted display, virtual reality glasses, etc.), robot navigation system, tablet, personal computer, laptop computer, or any type of device that has processing capabilities. As used herein, a mobile device may be any portable, or movable device or machine that is configurable to acquire wireless signals transmitted from, and transmit wireless signals to, one or more wireless communication devices or networks. Thus, by way of example but not limitation, device 300 may include a radio device, a cellular telephone device, a computing device, a personal communication system device, or other like movable wireless communication equipped device, appliance, or machine. The term "mobile device" is also intended to include devices which communicate with a personal navigation device, such as by short-range wireless, infrared, wire line connection, or other connection—regardless of whether satellite signal reception, assistance data reception, and/or position-related processing occurs at device 300. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

Device 300 may communicate wirelessly with a plurality of APs using RF signals (e.g., 2.4 GHz, 3.6 GHz, and 4.9/5.0 GHz bands) and standardized protocols for the modulation of the RF signals and the exchanging of information packets (e.g., IEEE 802.11n, 802.11ac, 802.11ax, etc.). By extracting different types of information from the exchanged signals, and utilizing the layout of the network (i.e., the network geometry) device 300 may determine position within a predefined reference coordinate system.

Crowdsourcing data as described herein may be implemented as software, firmware, hardware, module, or engine. In one embodiment, the previous description may be implemented by one or more general purpose processors (e.g., processor 301) and in memory (e.g., device memory 305) to achieve the previously desired functions (e.g., the method of FIG. 2). It should be appreciated that embodiments described herein may be implemented through the execution of instructions, for example as stored in the device memory 305, or other element, by processor 301 and/or other circuitry of device and/or other devices. Particularly, circuitry of device, including but not limited to processor 301, may operate under the control of a program, routine, or the execution of instructions to execute methods or processes in accordance with embodiments of the invention. For example, such a program may be implemented in firmware or software (e.g. stored in memory 305 and/or other locations) and may be implemented by processors, such as processor 301, and/or other circuitry of device. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by device itself and/or some or all of the functions, engines or modules described herein may be performed by another system connected through I/O controller 325 or network interface 310 (wirelessly or wired) to device. Thus, some and/or all of the functions may be performed by another system and the results or intermediate calculations may be transferred back to device. In some embodiments, such other device may comprise a server configured to process information in real time or near real time. In some embodiments, the other device is configured to predetermine the results, for example based on a known configuration of the device. Further, one or more of the elements illustrated in FIG. 3 may be omitted. For example, one or more of the sensors 340-365 may be omitted in some embodiments.

Those of skill would appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions or modules described may be implemented in hardware (e.g., device hardware 300), software, firmware, or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media/device may be any available media that can be accessed by a computer. By way of example, and not limitation, such non-transitory computer-readable media or storage devices can comprise RAM, ROM, EEPROM, CD-ROM or other optical disk storage, magnetic disk storage or another type of magnetic storage device, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Aspects of embodiments are disclosed in the description and related drawings are directed to specific embodiments. Alternate embodiments may be devised without departing from the scope described herein. Additionally, well-known elements of the various embodiments may not be described in detail or may be omitted so as not to obscure relevant details.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device (e.g., a server or device). It will be recognized that various actions described herein can be performed by specific circuits (e.g., application specific integrated circuits), by program instructions being executed by one or more processors (e.g., executable program instructions), or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

What is claimed is:

1. A method for sensor reporting to a server, the method comprising, at a mobile device:
   measuring, at a first position of the mobile device, a first radio signal characteristic;
   obtaining first motion sensor data comprising a plurality of sensor data points;
   measuring, after the mobile device moves from the first position to a second position relative to the first position, a second radio signal characteristic;
   determining a displacement between the second position and the first position based, at least in part, on the first motion sensor data, wherein the first position and the second position are unknown absolute positions; and
   sending, to a server, both:
      the motion sensor based displacement between the second unknown absolute position where the second radio signal characteristic is measured and the first unknown absolute position where the first radio signal characteristic is measured, and
      one or more indications representing one or both of the first radio signal characteristic measured at the first unknown absolute position and the second radio signal characteristic measured at the second unknown absolute position.

2. The method of claim 1, further comprising, at the mobile device:
   determining a reliability of the displacement according to one or more reliability characteristics; and
   sending the reliability determination to the server.

3. The method of claim 2, wherein the reliability characteristics comprise:
   a time elapsed while reading the first motion sensor data,
   a distance traveled by the mobile device while reading the first motion sensor data,
   a mobile device steadiness while reading the first motion sensor data,
   a frequency of mobile device turns, or
   any combination thereof.

4. The method of claim 1, further comprising, at the mobile device, at least one of:
   obtaining second motion sensor data; and
   estimating a change in an orientation or a turn degree from the first position to the second position based, at least in part, on the second motion sensor data.

5. The method of claim 1, wherein in response to a determination that the second position is within a threshold distance from the first position, the indications representing the first and second radio signal characteristics represents an average of the first radio signal characteristic and the second radio signal characteristic.

6. The method of claim 1, wherein one or both of the first or second radio signal characteristics are from a source having an unknown absolute location.

7. The method of claim 1, wherein the motion sensor providing the first motion sensor data comprises an accelerometer, a magnetometer, or a gyroscope.

8. The method of claim 1, further comprising, at the mobile device:
   receiving a radio signal from at least one of a wireless access point or a Bluetooth device, and wherein the first radio signal characteristic comprises one or more of: a time of arrival (TOA), a time difference of arrival (TDOA), round trip time (RTT), a received signal strength indicator (RSSI), or any combination thereof, corresponding to the radio signal.

9. The method of claim 1, further comprising:
receiving, from the server as a result of the sending of both: the motion sensor based displacement between the second unknown absolute position where the second radio signal characteristic is measured and the first unknown absolute position where the first radio signal characteristic is measured, and the one or more indications representing one or both of the first radio signal characteristic measured at the first unknown absolute position and the second radio signal characteristic measured at the second unknown absolute position:
a wireless transmitter position determined at least in part from the displacement and the one or more indications.

10. A mobile device for sensor reporting to a server, the mobile device comprising:
a motion sensor;
a wireless subsystem; and
a processor coupled to the motion sensor and the wireless subsystem and configured to:
measure, at a first position of the mobile device, a first radio signal characteristic for a first radio signal acquired via the wireless subsystem;
obtain, via the motion sensor, first sensor data comprising a plurality of sensor data points;
measure, after the mobile device moves from the first position to a second position relative to the first position, a second radio signal characteristic for a second radio signal acquired via the wireless subsystem;
determine a displacement between the second position and the first position based, at least in part, on the first motion sensor data, wherein the first position and the second position have unknown absolute locations; and
send, to a server via the wireless subsystem both:
the motion sensor based displacement between the second unknown absolute position where the second radio signal characteristic is measured and the first unknown absolute position where the first radio signal characteristic is measured, and
one or more indications representing one or both of the first radio signal characteristic measured at the first position and the second radio signal characteristic measured at the second position.

11. The mobile device of claim 10, the processor to further:
determine a reliability of the displacement according to one or more reliability characteristics; and
send the reliability determination to the server via the wireless subsystem.

12. The mobile device of claim 11, wherein the reliability characteristics comprise:
a time elapsed while reading the first motion sensor data,
a distance traveled by the mobile device while reading the first motion sensor data,
a mobile device steadiness while reading the first motion sensor data,
a frequency of mobile device turns, or
any combination thereof.

13. The mobile device of claim 10, the processor to further:
obtain, via the motion sensor, second motion sensor data; and
estimate a change in an orientation or a turn degree from the first position to the second position based, at least in part, on the second motion sensor data.

14. The mobile device of claim 10, the processor to further:
in response to a determination that the second position is within a threshold distance from the first position, include an average of the first radio signal characteristic and the second radio signal characteristic in the one or more indications representing the first and second radio signal characteristics.

15. The mobile device of claim 10, wherein one or both of the first or second radio signal characteristics are from a source having an unknown absolute location.

16. The mobile device of claim 10, wherein the motion sensor comprises an accelerometer, a magnetometer, or gyroscope.

17. The mobile device of claim 10, wherein the first radio signal characteristic is based, at least in part, on: a time of arrival (TOA), a time difference of arrival (TDOA), a round trip time (RTT), a received signal strength indicator (RSSI), or any combination thereof, corresponding to the first radio signal.

18. An article comprising:
a non-transitory machine readable storage medium comprising program instructions that are executable by a processor of a mobile device to:
measure, at a first position of the mobile device, a first radio signal characteristic;
obtain first motion sensor data comprising a plurality of sensor data points;
measure, after the mobile device moves from the first position to a second position relative to the first position, a second radio signal characteristic;
determine a displacement between the second position and the first position based, at least in part, on the first motion sensor data, wherein the first position and the second position are unknown absolute positions; and
send, to a server, both:
the motion sensor based displacement between the second unknown absolute position where the second radio signal characteristic is measured and the first unknown absolute position where the first radio signal characteristic is measured, and
one or more indications representing one or both of the first radio signal characteristic measured at the first position and the second radio signal characteristic measured at the second position.

19. The article of claim 18, further comprising program instructions that are executable by the processor to:
determine a reliability of the displacement according to one or more reliability characteristics; and
send the reliability determination to the server.

20. The article of claim 19, wherein the reliability characteristics comprise:
a time elapsed while reading the first motion sensor data,
a distance traveled by the mobile device while reading the first motion sensor data,
a mobile device steadiness while reading the first motion sensor data,
a frequency of mobile device turns, or
any combination thereof.

21. The article of claim 18, further comprising program instructions that are executable by the processor to:
obtain second motion sensor data within the mobile device; and
estimate a change in an orientation or a turn degree from the first position to the second position based, at least in part, on the second motion sensor data.

22. The article of claim 18, further comprising program instructions that are executable by the processor to:
in response to a determination that the second position is within a threshold distance from the first position, include an average of the first radio signal characteristic and the second radio signal characteristic in the one or more indications representing the first and second radio signal characteristics.

23. The article of claim 18, wherein one or both of the first or second radio signal characteristics are from a source having an unknown absolute location.

24. An apparatus for use in a mobile device for sensor reporting to a server, the apparatus comprising:
means for measuring, at a first position of the mobile device, a first radio signal characteristic;
means for obtaining first sensor data comprising a plurality of sensor data points;
means for measuring, after the mobile device moves from the first position to a second position relative to the first position, a second radio signal characteristic;
means for determining a displacement between the second position and the first position based at least in part, on the first motion sensor data, wherein the first position and the second position are unknown absolute positions; and
means for sending, to a server, both:
the motion sensor based displacement between the second unknown absolute position where the second radio signal characteristic is measured and the first unknown absolute position where the first radio signal characteristic is measured, and
one or more indications representing one or both of the first radio signal characteristic measured at the first position and the second radio signal characteristic measured at the second position.

25. The apparatus of claim 24, further comprising:
means for determining a reliability of the displacement according to one or more reliability characteristics; and
means for sending the reliability determination to the server.

26. The apparatus of claim 25, wherein the reliability characteristics comprise:
a time elapsed while reading the first motion sensor data,
a distance traveled by the mobile device while reading the first motion sensor data,
a mobile device steadiness while reading the first motion sensor data,
a frequency of mobile device turns, or
any combination thereof.

27. The apparatus of claim 24, further comprising:
means for obtaining second motion sensor data within the mobile device; and
means for estimating a change in an orientation or a turn degree from the first position to the second position based, at least in part, on the second motion sensor data.

28. The apparatus of claim 24, wherein in response to a determination that the second position is within a threshold distance from the first position, the indications representing the first and second radio signal characteristics represents an average of the first radio signal characteristic and the second radio signal characteristic.

29. The apparatus of claim 24, wherein one or both of the first or second radio signal characteristics are from a source having an unknown absolute location.

* * * * *